(12) United States Patent
Moriya

(10) Patent No.: US 9,588,719 B2
(45) Date of Patent: Mar. 7, 2017

(54) COMMUNICATION APPARATUS, COMMUNICATION METHOD AND COMPUTER-READABLE STORAGE MEDIUM

(71) Applicant: CANON KABUSHIKI KAISHA, Tokyo (JP)

(72) Inventor: Takashi Moriya, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/244,606

(22) Filed: Apr. 3, 2014

(65) Prior Publication Data

US 2014/0320900 A1     Oct. 30, 2014

(30) Foreign Application Priority Data

Apr. 26, 2013   (JP) ................................. 2013-094639
Feb. 27, 2014   (JP) ................................. 2014-037322

(51) Int. Cl.
*G06F 15/00*     (2006.01)
*G06F 3/12*     (2006.01)

(52) U.S. Cl.
CPC .......... *G06F 3/1206* (2013.01); *G06F 3/1209* (2013.01); *G06F 3/1236* (2013.01); *G06F 3/1292* (2013.01); *G06F 3/1231* (2013.01)

(58) Field of Classification Search
CPC ..... G06F 3/1206; G06F 3/1231; G06F 3/1292
USPC ......................................................... 358/1.15
See application file for complete search history.

(56) References Cited

U.S. PATENT DOCUMENTS

2004/0145779 A1*   7/2004   Kuribayashi ................ 358/1.16
2011/0208881 A1*   8/2011   Abe ................................. 710/15
2013/0148149 A1*   6/2013   Park et al. .................... 358/1.13
2013/0259025 A1*   10/2013   Terashita ....................... 370/351

FOREIGN PATENT DOCUMENTS

JP     2013-042400 A     2/2013

OTHER PUBLICATIONS

U.S. Appl. No. 14/257,108, filed Apr. 21, 2014.
U.S. Appl. No. 14/257,178, filed Apr. 21, 2014.

* cited by examiner

*Primary Examiner* — Mark Milia
(74) *Attorney, Agent, or Firm* — Fitzpatrick, Cella, Harper & Scinto

(57) ABSTRACT

Different destination information are assigned to a plurality of services which use a common communication protocol in an application layer, as services provided to a communication partner apparatus with which to communicate via a network. The communication partner apparatus is notified of the assigned destination information and their corresponding services.

17 Claims, 12 Drawing Sheets

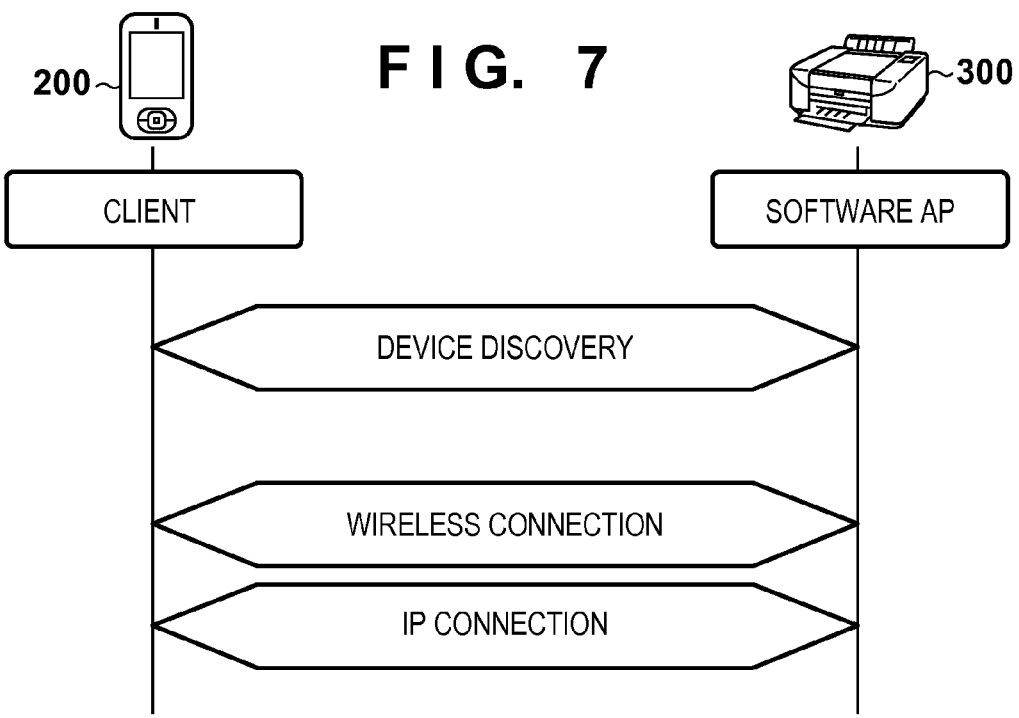
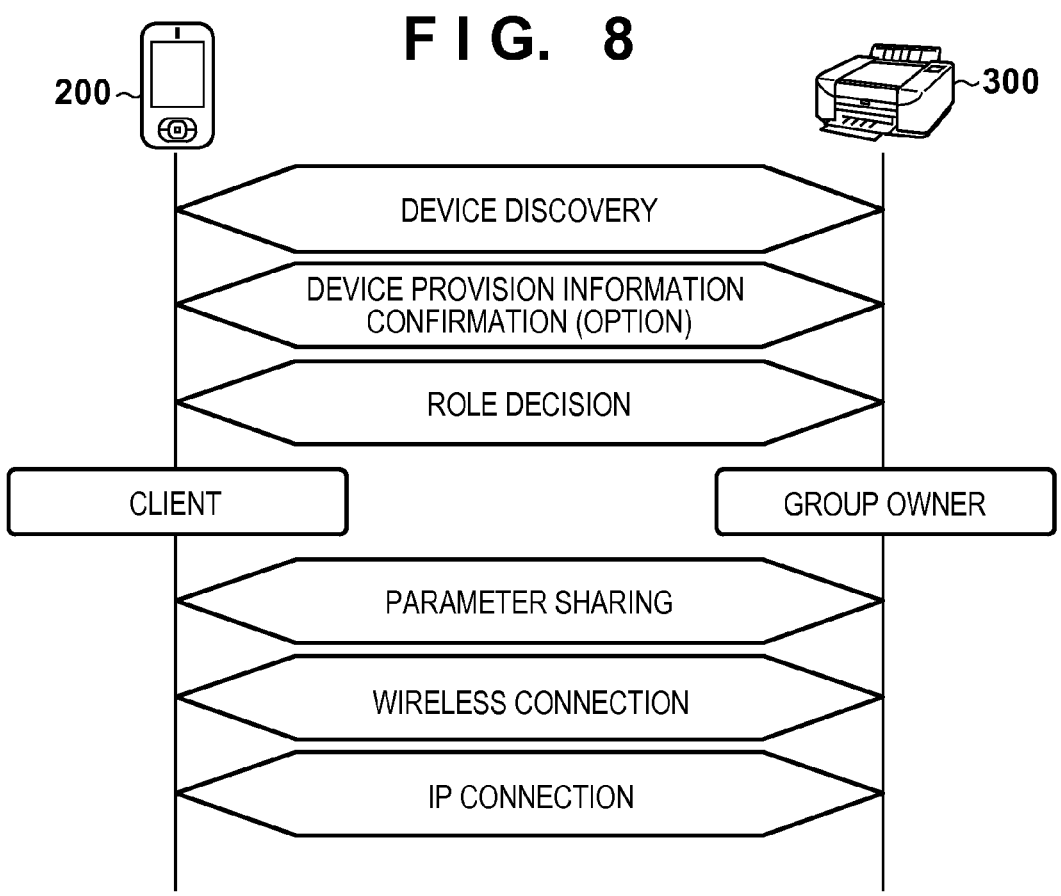

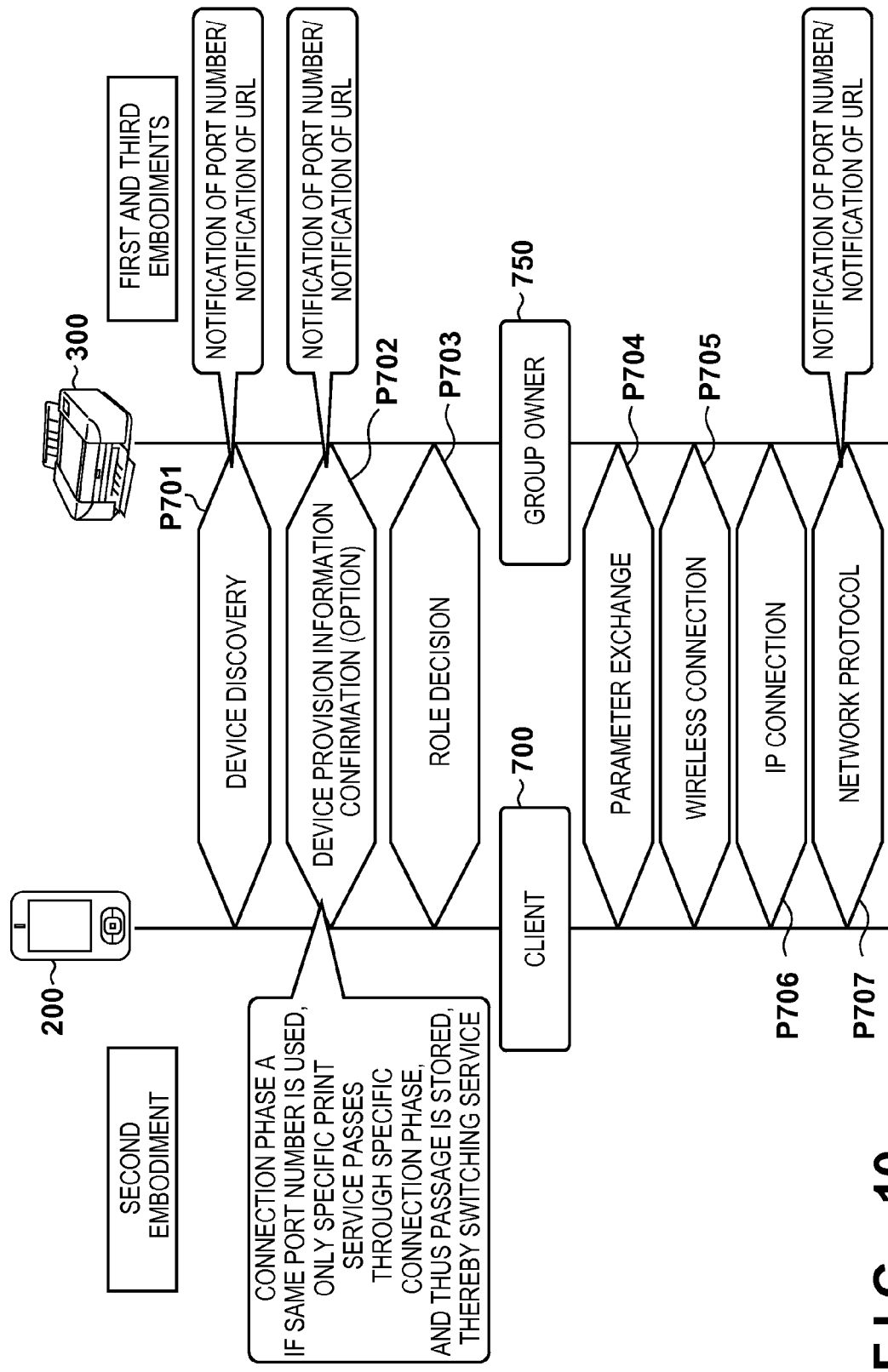
F I G. 10

F I G. 14
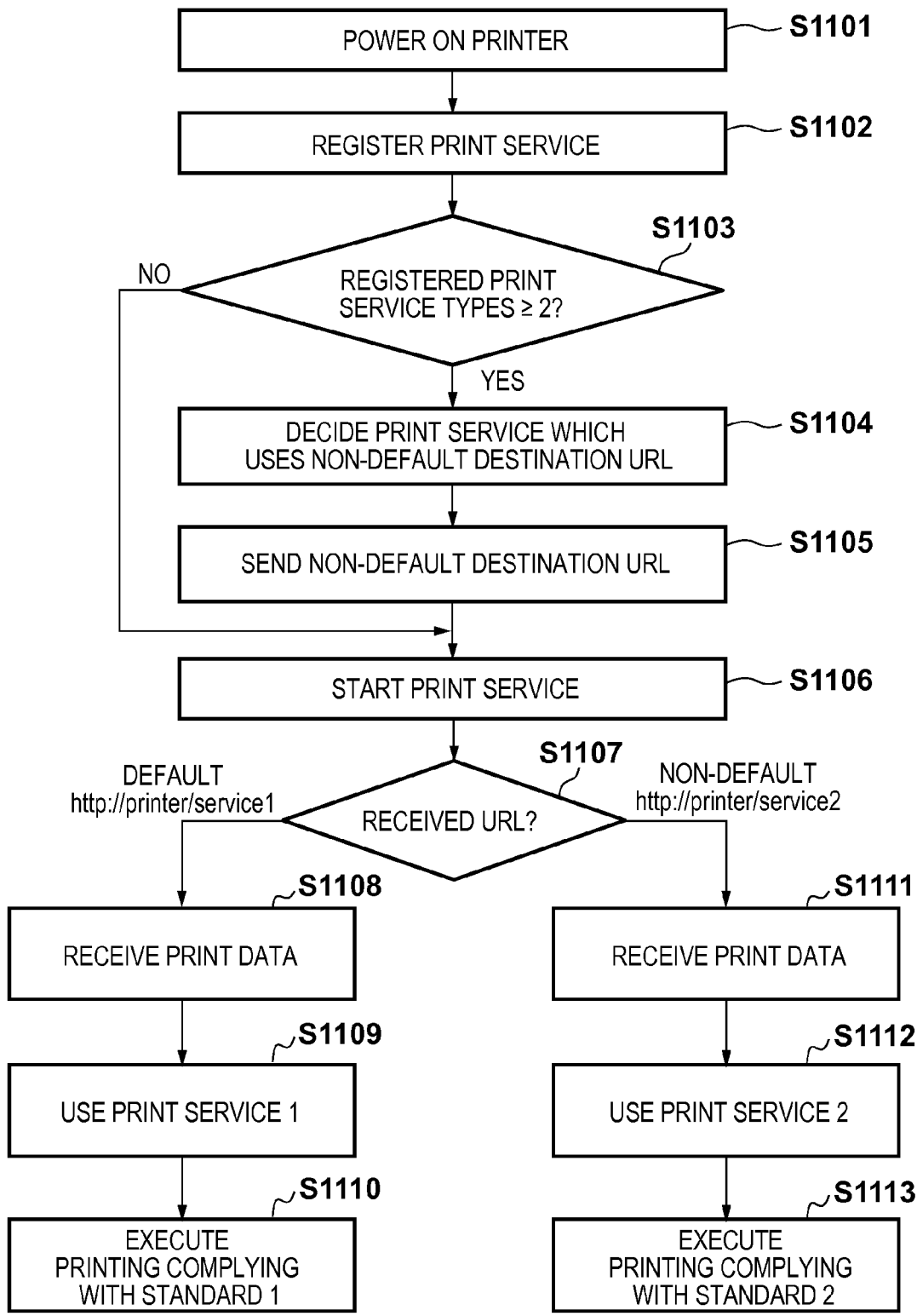

PRIOR ART

COMMUNICATION APPARATUS, COMMUNICATION METHOD AND COMPUTER-READABLE STORAGE MEDIUM

BACKGROUND OF THE INVENTION

Field of the Invention

The present invention relates to a communication apparatus, a communication method, and a computer-readable storage medium.

Description of the Related Art

A wireless communication standard called Wi-Fi Direct® is known. Wi-Fi Direct is one of wireless communication standards (Wi-Fi) certified by Wi-Fi alliance, which enables a terminal to directly connect to another terminal to transmit/receive data without an access point used in a normal Wi-Fi connection method.

Wi-Fi Direct implements direct connection between electronic devices by defining a protocol for automatically deciding whether each electronic device operates as a wireless LAN access point or wireless LAN station, and eliminating the need for a conventional dedicated device as an access point. As a method of directly connecting terminals by a wireless LAN, there is an "ad hoc mode" in which terminals are connected to each other using a P2P (Peer to Peer) method, in addition to Wi-Fi Direct. The difference between Wi-Fi Direct and the ad hoc mode is as follows. That is, Wi-Fi Direct is a method in which any one of terminals implements the function of a wireless LAN access point (host device), and the ad hoc mode is a connection method which uses no access point.

Japanese Patent Laid-Open No. 2013-42400 describes a technique using Wi-Fi Direct. Japanese Patent Laid-Open No. 2013-42400 discloses a technique in which a PC wirelessly communicates with a printer using a Wi-Fi Direct function to transmit print data.

There are, for example, a plurality of print services using standards between an information processing apparatus and a printing apparatus. If, however, the services use the same communication protocol in a basic application layer, they also generally use the same default port number. This is because a destination port number is generally determined by IANA (Internet Assigned Numbers Authority).

If a plurality of print services use a common destination port number on the server side, it is impossible to discriminate differences in the print services which are derived from differences in the standards. For example, the following situation is considered:

Standard 1: communication protocol A, print data format B, rule D for a printing paper designation method; and Standard 2: communication protocol A, print data format C, rule E for a printing paper designation method.

Note that since the transmission source port number of a client is automatically assigned on the client side, no such problem arises.

As shown in FIG. 15, for example, if print service 1 and print service 2 are executed between an information processing apparatus functioning as a client and a printing apparatus functioning as a server using the same communication protocol, the print services execute the same port (for example, a port number of 80).

As described above, if different print services share a single port, it may be impossible to correctly perform print processing in each print service. As a result, the user may not be able to obtain an intended printing result. This problem may also arise in cases other than those in which the destination of transmission data from a client to a server is specified by a port number (for example, a case in which the destination is specified by a URL or the like). Furthermore, this problem may arise in services other than print services.

SUMMARY OF THE INVENTION

The present invention provides a communication technique capable of normally performing processes in a plurality of types of services exchanged between communication apparatuses.

A communication apparatus according to the present invention has the following arrangement. That is, there is provided a communication apparatus comprising: an execution unit configured to execute, as services provided to a communication partner apparatus with which to communicate via a network, a plurality of services which use a common communication protocol in an application layer; an assignment unit configured to assign different destination information to the respective services executed by the execution unit; a notification unit configured to notify the communication partner apparatus of assignment information including the destination information assigned by the assignment unit and the corresponding services; and a specifying unit configured to specify a service to be executed by the execution unit in accordance with the destination information transmitted by the communication partner apparatus.

According to the present invention, it is possible to normally perform processes in a plurality of types of services exchanged between communication apparatuses.

Further features of the present invention will become apparent from the following description of exemplary embodiments with reference to the attached drawings.

BRIEF DESCRIPTION OF THE DRAWINGS

FIG. 7 is a sequence chart showing a wireless connection sequence in mode A (a software AP mode);

FIG. 8 is a sequence chart showing a wireless connection sequence in mode B (a WFD mode);

FIG. 10 is a sequence chart showing the sequence of a wireless connection phase in Wi-Fi Direct according to each embodiment;

FIG. 14 is a flowchart illustrating processing executed by a server 850 according to the third embodiment.

DESCRIPTION OF THE EMBODIMENTS

Embodiments of the present invention will be exemplarily described in detail below with reference to the accompanying drawings. Note that the relative arrangement of components, display screens, and the like set forth in the embodiment do not intend to limit the scope of the invention to them, unless otherwise specified.

<System Configuration>

A system configuration for implementing each embodiment to be described below will be explained first with reference to FIGS. 1 to 6.

Figure 1:
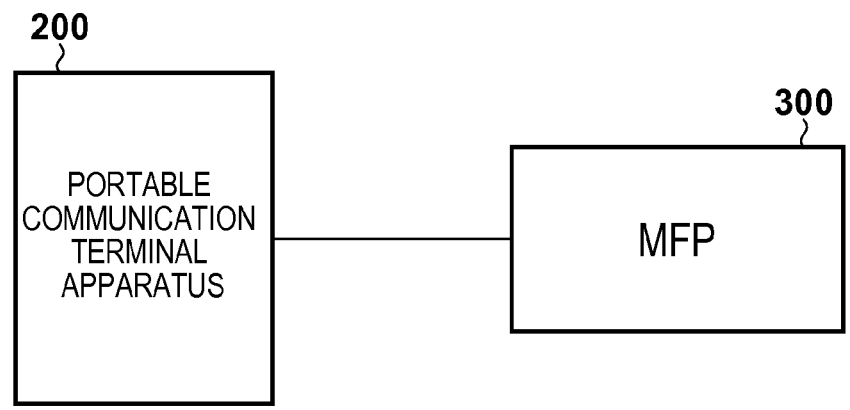
FIG. 1 is a view showing an example of the configuration of a wireless communication system.

FIG. 1 is a view showing the arrangement of a system including a portable communication terminal apparatus and a printing apparatus (MFP).

A portable communication terminal apparatus 200 is an apparatus including a wireless LAN (WLAN) communication unit and a short distance wireless communication unit. Note that short distance wireless communication indicates wireless communication whose communication range is a relatively narrow predetermined range (for example, 1 m to several cm or less), which is represented by NFC. The portable communication terminal apparatus 200 may be a personal information terminal such as a PDA (Personal Digital Assistant), a mobile phone, a digital camera, or the like. A printing apparatus (MFP) 300 need only be wirelessly communicable with the portable communication terminal apparatus 200, and may additionally have a reading function (scanner), a FAX function, and a telephone function. In this embodiment, an MFP (Multi Function Printer) having a reading function and a printing function will be exemplified. Each of the portable communication terminal apparatus 200 and the MFP 300 has a short distance wireless communication unit using NFC. Even if no power is supplied to the portable communication terminal apparatus 200, it is possible to perform short distance wireless communication by moving the portable communication terminal apparatus 200 closer to the MFP 300 within a predetermined distance where NFC communication is possible. The MFP 300 is wirelessly communicable via a network (network in which communication can be performed using TCP/IP) using a WLAN communication unit. One or both of the portable communication terminal apparatus 200 and the MFP 300 may perform wireless communication using only the WLAN communication unit without the short distance wireless communication unit. Note that the portable communication terminal apparatus 200 and the MFP 300 can execute processes respectively corresponding to a plurality of print services via a WLAN, as will be described later.

Figure 2:
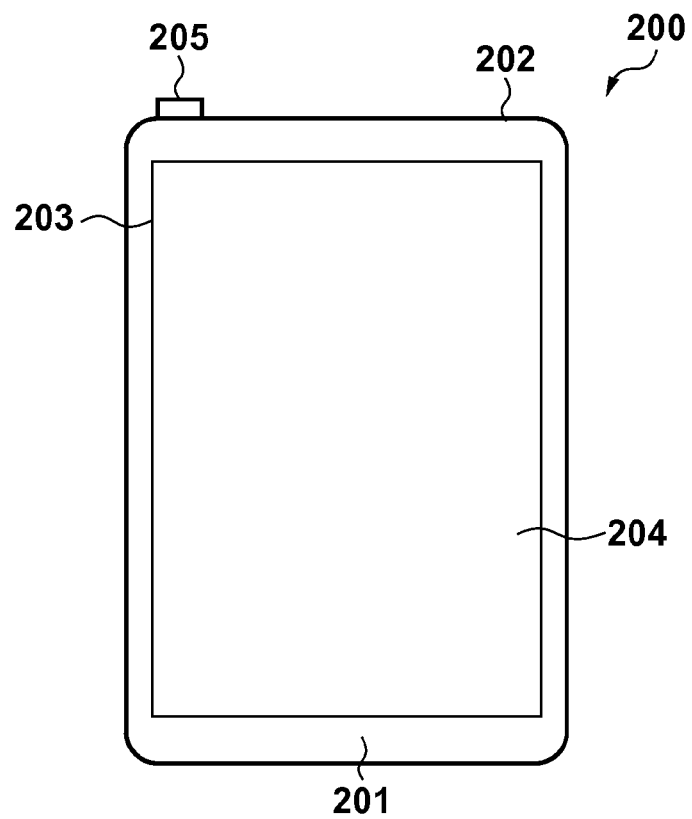
FIG. 2 is a view showing the outer appearance of a portable communication terminal apparatus.

FIG. 2 is a view showing the outer appearance of the portable communication terminal apparatus 200.

In this embodiment, a smartphone will be exemplified. The smartphone indicates a multi-function mobile phone which incorporates a camera, web browser, email function, and the like in addition to functions of a mobile phone. An NFC unit 201 is a unit for performing communication using NFC. When the NFC unit 201 is moved closer to a partner NFC unit within a predetermined distance (for example, about 10 cm), they can communicate with each other using NFC.

A WLAN unit 202 is a unit used to perform communication by WLAN. Assume that the WLAN unit 202 can perform data (packet) communication in a WLAN system complying with, for example, IEEE802.11 series. Examples of wireless communication using the WLAN unit 202 include communication based on Wi-Fi Direct (WFD), and communication in a software AP mode, ad hoc mode, and infrastructure mode. A display unit 203 is, for example, a display having an LCD display mechanism. An operation unit 204 includes a touch-panel operation mechanism, and detects an operation by the user. As a representative operation method, the display unit 203 displays button icons and a software keyboard, and when the user touches them, operation events are detected. A power key 205 is a hard key used to turn on/off the power.

Figure 3A:
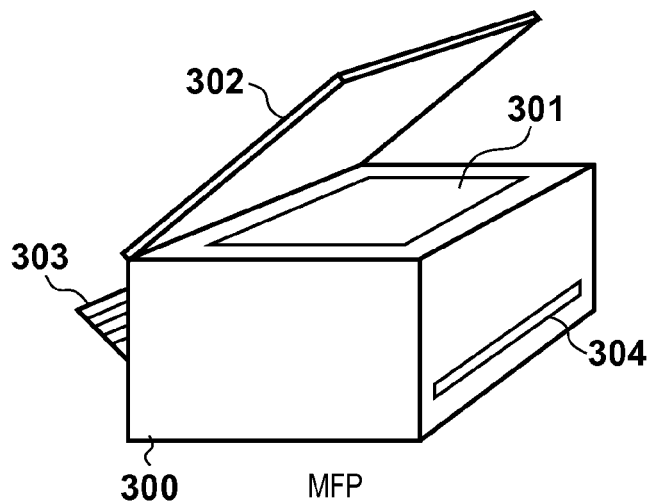
FIG. 3A is a view showing the outer appearance of an MFP.
Figure 3B:
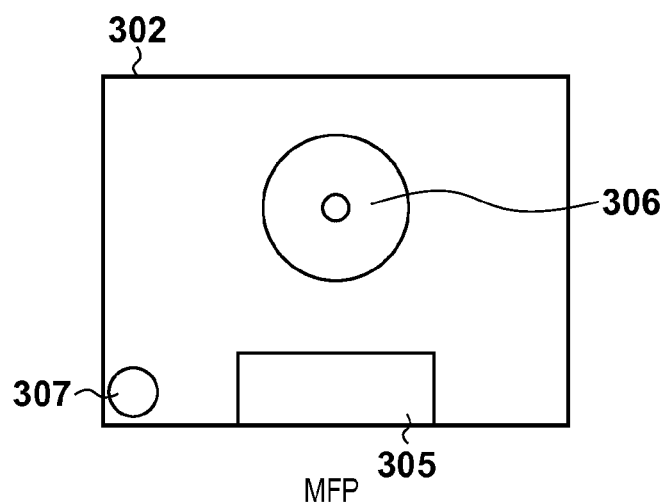
FIG. 3B is a view showing the outer appearance of the MFP.

FIGS. 3A and 3B are views showing the outer appearance of the MFP 300.

Referring to FIG. 3A, a document table 301 is a glass-like transparent table on which a document to be read by a scanner (reading unit) is placed. A document cover 302 is a cover used to press a document when the scanner reads the document, and prevent external leakage of light from a light source, with which the document is irradiated at the time of reading. A printing paper insert port 303 is an insert port on which paper sheets of various sizes can be set. Paper sheets set on the printing paper insert port 303 are conveyed one by one to a printing unit, and are discharged from a printing paper discharge port 304 after printing is performed by the printing unit.

Referring to FIG. 3B, an operation display unit 305 and an NFC unit 306 are arranged on the upper portion of the document cover 302. The operation display unit 305 will be described in detail with reference to FIG. 4. The NFC unit 306 is a unit used to perform short distance wireless communication, and is a place where the portable communication terminal apparatus 200 is moved closer to the MFP 300. A predetermined distance (about 10 cm) from the NFC unit 306 is an effective distance of NFC communication. A WLAN antenna 307 is an antenna which is used to perform communication by WLAN and is embedded in the MFP.

Figure 4:
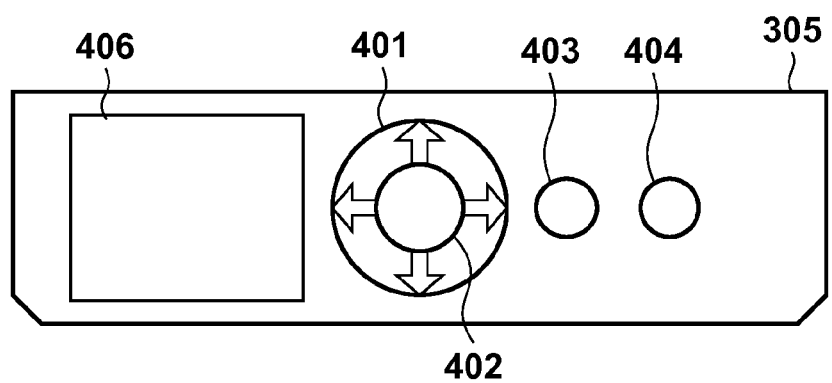
FIG. 4 is a view showing an example of the operation unit of the MFP.

FIG. 4 is a plan view showing the operation display unit 305.

A display unit 406 is a display screen used to display images and a user interface such as an operation menu, and includes, for example, a dot matrix LCD. A 4-way selector 401 is used for operations such as cursor movements on the display unit 406. A set key 402 is a key used to input settings. A function key 403 is used for an operation such as a function setting operation. A start key 404 is used to issue a function execution instruction such as a print start instruction.

Figure 5:
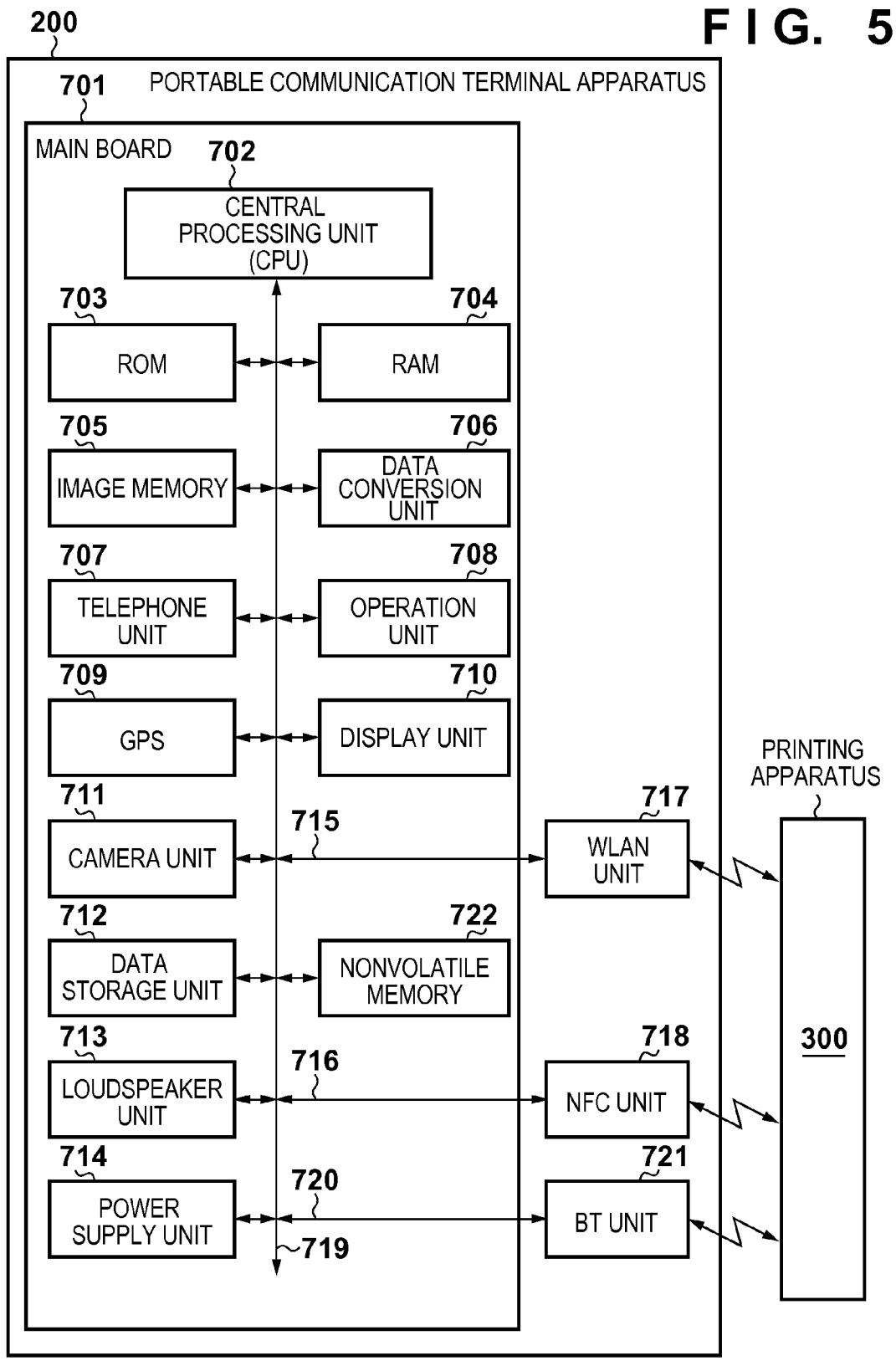
FIG. 5 is a block diagram showing the arrangement of the portable communication terminal apparatus.

FIG. 5 is a block diagram showing the arrangement of the portable communication terminal apparatus 200.

The portable communication terminal apparatus 200 includes a main board 701 for executing main control of the apparatus itself, a WLAN unit 717 for performing WLAN communication, an NFC unit 718 for performing NFC communication, and a BT unit 721 for performing Bluetooth® communication.

In the main board 701, a CPU (Central Processing Unit) 702 is a system control unit, and controls the overall portable communication terminal apparatus 200. The following processing by the portable communication terminal apparatus 200 is executed under the control of the CPU 702. A ROM 703 stores control programs to be executed by the CPU 702, an embedded operating system (OS) program, and the like. In this embodiment, the respective control programs stored in the ROM 703 execute software control such as scheduling and task switching under the management of the embedded OS stored in the ROM 703.

A RAM 704 is implemented by an SRAM (Static RAM) or the like, stores data such as program control variables, also stores data such as setting values registered by the user and management data of the portable communication terminal apparatus 200, and is allocated with various work buffer areas.

An image memory 705 is implemented by a memory such as a DRAM (Dynamic RAM), and temporarily stores image data received via a communication unit and those read out from a data storage unit 712 so as to be processed by the CPU 702. Note that the communication unit is a general term for communication functions including the WLAN unit 717, NFC unit 718, and BT unit 721.

A nonvolatile memory 722 is implemented by a memory such as a flash memory, and continues to store data even after power-off. Note that the memory structure is not limited to this. For example, the image memory 705 and the RAM 704 may share a memory, or data may be backed up in the data storage unit 712. In this embodiment, a DRAM is used as the image memory 705. However, the present invention is not limited to this since another storage medium such as a hard disk or a nonvolatile memory may be used.

A data conversion unit 706 executes analysis of data of various formats, and data conversion such as color conversion and image conversion. A telephone unit 707 controls a telephone line, and implements telephone communication by processing audio data input/output via a loudspeaker unit 713. An operation unit 708 controls signals of the operation unit 204 (FIG. 2). A GPS (Global Positioning System) 709 acquires position information such as the current latitude and longitude of the portable communication terminal apparatus 200. A display unit 710 electronically controls the display contents of the display unit 203 (FIG. 2), allows various input operations, and can display operation states, status conditions, and the like of the MFP 300.

A camera unit 711 has a function of electronically recording and encoding an image input via a lens. An image captured by the camera unit 711 is saved in the data storage unit 712. The loudspeaker unit 713 implements a function of inputting or outputting a speech for a telephone function, and also an alarm notification function and the like. A power supply unit 714 is implemented by a portable battery, and controls power supply to the apparatus. A power supply state includes a battery dead state in which the battery has no remaining amount, a power-off state in which the power key 205 is not pressed, an active state in which the apparatus is normally active, and a power saving state in which the apparatus is active but is set in a power saving mode.

The portable communication terminal apparatus 200 incorporates three communication units used to perform wireless communication, and can perform wireless communication by WLAN, NFC, and Bluetooth®. Thus, the portable communication terminal apparatus 200 performs data communication with another device such as an MFP. Each communication unit converts data into packets, and transmits the packets to the other device. Conversely, each communication unit converts packets coming from another external device into original data, and transmits the data to the CPU 702. The WLAN unit 717, NFC unit 718, and BT unit 721 are connected to the main board 701 via bus cables 715, 716, and 720, respectively. The WLAN unit 717, NFC unit 718, and BT unit 721 are units each used to attain communication complying with its standard.

The respective components 703 to 714, 717, 718, 721, and 722 of the main board 701 are connected to each other via a system bus 719 managed by the CPU 702.

Figure 6:
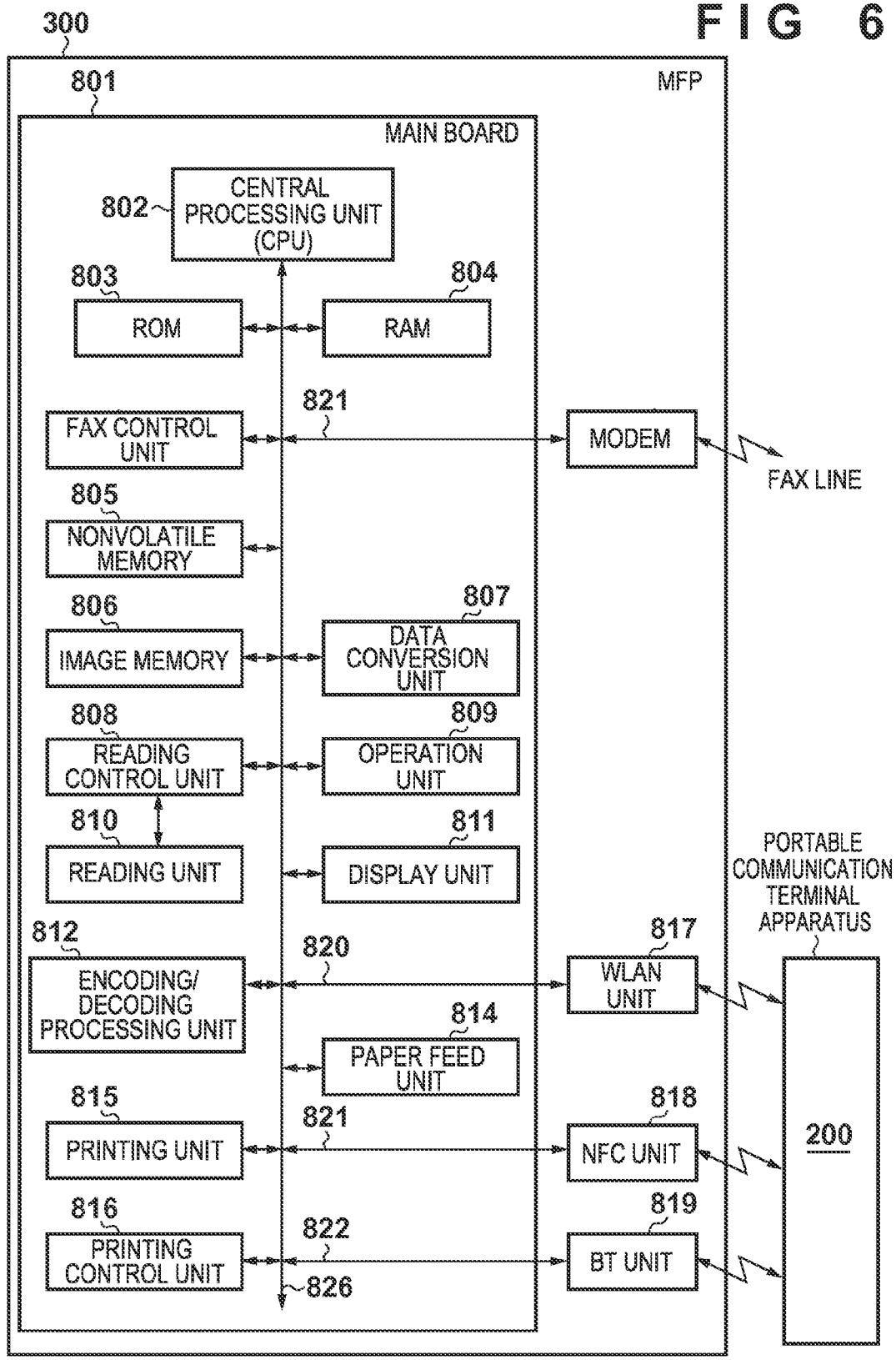
FIG. 6 is a block diagram showing the arrangement of the MFP.

FIG. 6 is a block diagram showing the arrangement of the MFP 300.

The MFP 300 includes a main board 801 for executing main control of the apparatus itself, a WLAN unit 817 for performing WLAN communication, an NFC unit 818 for performing NFC communication, and a BT unit 819 for performing Bluetooth® communication.

In the main board 801, a CPU (Central Processing Unit) 802 is a system control unit, and controls the overall MFP 300. The following processing by the MFP 300 is executed under the control of the CPU 802. A ROM 803 stores control programs to be executed by the CPU 802, an embedded operating system (OS) program, and the like. In this embodiment, the respective control programs stored in the ROM 803 perform software control such as scheduling and task switching under the management of the embedded OS stored in the ROM 803. A RAM 804 is implemented by an SRAM (Static RAM) or the like, stores data such as program control variables, also stores data such as setting values registered by the user and management data of the MFP 300, and is allocated with various work buffer areas.

A nonvolatile memory 805 is implemented by a memory such as a flash memory, and continues to store data even after power-off. An image memory 806 is implemented by a memory such as a DRAM (Dynamic RAM), and stores image data received via a communication unit, those processed by an encoding/decoding processing unit 812, and those acquired via a memory card controller. Also, the memory structure is not limited to this, similarly to the memory structure of the portable communication terminal apparatus 200. A data conversion unit 807 executes analysis of data of various formats, conversion from image data into print data, and the like.

Note that the communication unit is a general term for communication functions including the WLAN unit 817, NFC unit 818, and BT unit 819.

A reading control unit 808 controls a reading unit 810 (for example, a CIS image sensor (contact type image sensor)) to optically read an image on a document. Next, an image signal obtained by converting the read image into electrical image data is output. At this time, various kinds of image processing such as binarization processing and halftone processing may be performed for the image signal, thereby outputting the resultant data.

An operation unit 809 and a display unit 811 correspond to the operation display unit 305 shown in FIG. 4. The encoding/decoding processing unit 812 executes encoding/decoding processing and enlargement/reduction processing for image data (JPEG, PNG, or the like) handled by the MFP 300. A paper feed unit 814 holds paper sheets used in printing. A paper sheet can be fed from the paper feed unit 814 under the control of a printing control unit 816. Especially, as the paper feed unit 814, a plurality of paper feed units can be prepared so as to hold a plurality of types of paper sheets in one apparatus. Then, the printing control unit 816 can control to select a paper feed unit to be used to supply paper sheets.

The printing control unit 816 performs various kinds of image processing such as smoothing processing, printing density correction processing, and color correction for image data to be printed, and outputs the resultant data to a printing unit 815. The printing unit 815 can adopt an inkjet printer which prints an image by discharging, from a printhead, ink supplied from an ink tank. The printing control unit 816 also serves to periodically read out information of the printing unit 815, and update information in the RAM

804. More specifically, the printing control unit 816 updates status information such as the remaining amount of an ink tank and a printhead state.

The MFP 300 also incorporates three communication units used to perform wireless communication, similarly to the portable communication terminal apparatus 200, and a description of these communication units will be omitted since their functions are the same. The WLAN unit 817, NFC unit 818, and BT unit 819 are connected to the main board 801 via bus cables 820, 821, and 822, respectively. Note that the portable communication terminal apparatus 200 and the MFP 300 can perform communication based on WFD, and has a software access point (software AP) function.

The respective components 802 to 819 of the main board 801 are connected to each other via a system bus 826 managed by the CPU 802.

<P2P (Peer to Peer) Method>

As a method of implementing the P2P mode (peer-to-peer mode) in communication by WLAN, a plurality of modes are plausible. In each mode, a discovery device searches for a device (communication partner apparatus) as a communication partner using the same device discovery command (for example, Probe Request frame), thereby finding the device. It is possible to transmit a device discovery command added with various attributes (parameters). It is recommended that when attributes are designated in the discovery command, the device responds to interpretable attributes as much as possible within a range defined by the specifications of the mode and assumed specifications (Wi-Fi for WFD) as a response to the device discovery command. Even if information (including the above attributes) added to the device discovery command includes uninterpretable information, it is possible to respond to the received device discovery command based on only interpretable information.

As modes in the P2P mode, the following three modes are plausible.

mode A (software AP mode)
mode B (Wi-Fi Direct (WFD) mode)
mode C (WFD extend mode)

For the respective modes, compatible devices may be different, and usable applications may also be different.

Wireless connection sequences in the respective modes will be described below with reference to FIGS. 7 to 9.

FIG. 7 is a sequence chart showing a wireless connection sequence in mode A (software AP mode).

In the software AP mode, among devices (for example, the portable communication terminal apparatus 200 and the MFP 300) which communicate with each other, one (for example, the portable communication terminal apparatus 200) serves as a client which requests various services, and the other (for example, MFP 300) serves as a software AP which implements the function of an access point in WLAN by software settings.

In the software AP mode, the client discovers a device to serve as a software AP by using a device discovery command. When the software AP is discovered, the remaining wireless connection processing (establishment of a wireless connection and the like) is performed between the client and the software AP, and then IP connection processing (assignment of IP addresses and the like) is executed.

Note that it is only necessary to use commands and parameters defined by the Wi-Fi standard as those transmitted/received to implement wireless connection between the client and the software AP, and a description thereof will be omitted.

FIG. 8 is a sequence chart showing a wireless connection sequence in mode B (WFD mode).

In the WFD mode, after a device as a communication partner is discovered by a device discovery command, the roles of a P2P group owner and P2P client are decided, and wireless connection is performed. The role decision processing corresponds to, for example, GO Negotiation in P2P.

More specifically, one of devices which communicate with each other issues a device discovery command, and discovers a device to be connected in the WFD mode. When the other device as a communication partner is discovered, the devices confirm information about services and functions which can be provided to each other (device provision information confirmation). Note that the device provision information confirmation phase is not essential but optional. The device provision information confirmation phase corresponds to, for example, Provision Discovery in P2P.

By confirming the device provision information, which of the devices serves as a P2P client or a P2P group owner is decided. When the P2P client and group owner are decided, they exchange parameters for performing communication by Wi-Fi Direct (parameter exchange phase). The client and the group owner perform the remaining wireless connection processing and IP connection processing based on the exchanged parameters. The parameter exchange phase corresponds to, for example, automatically exchanging parameters for wireless LAN security using Wi-Fi Protected Setup.

Figure 9:
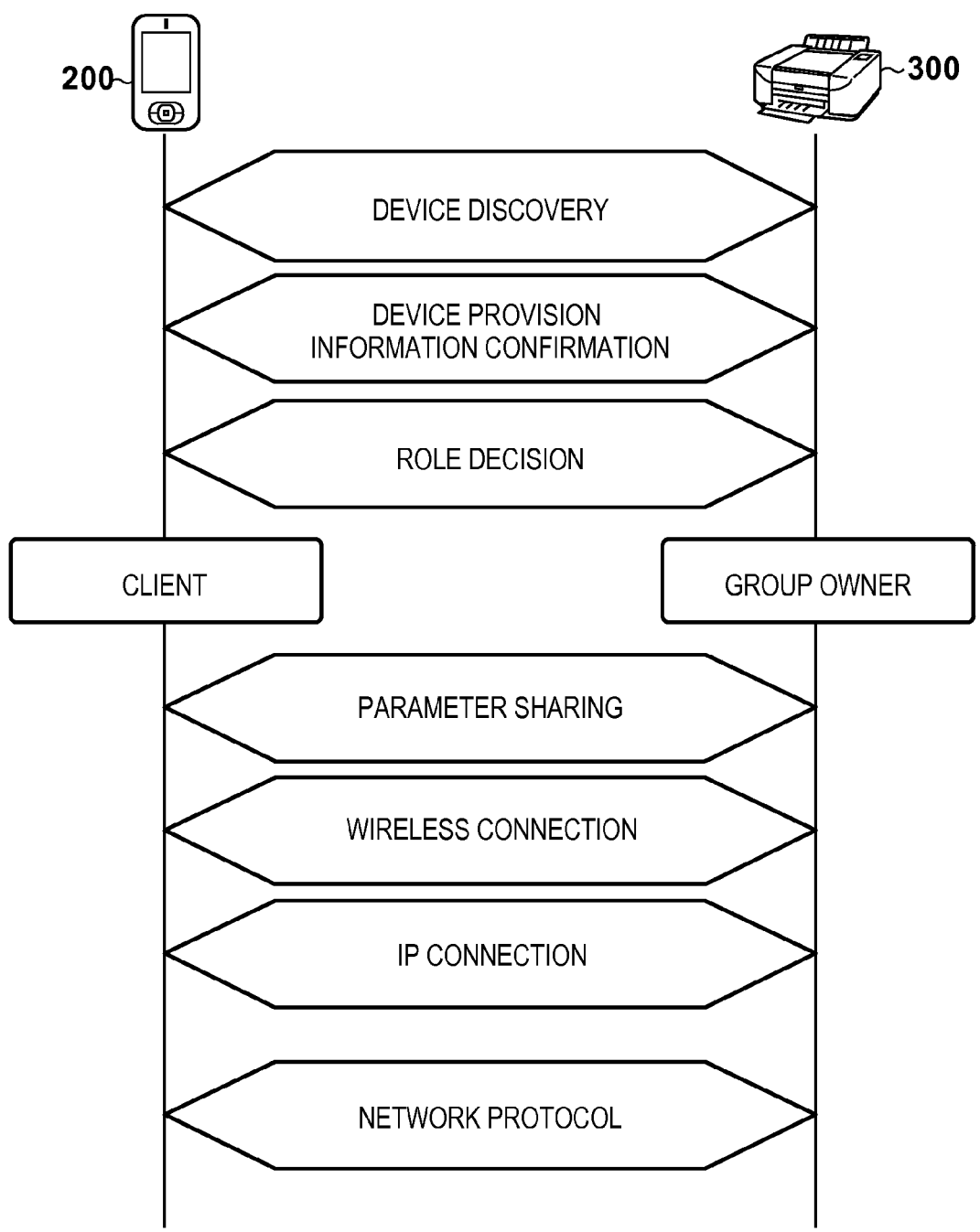
FIG. 9 is a sequence chart showing a wireless connection sequence in mode C (a WFD extend mode)

FIG. 9 is a sequence chart showing a wireless connection sequence in mode C (WFD extend mode).

The WFD extend mode is a mode obtained by extending the WFD mode, and requires device provision information confirmation which is optional in the WFD mode. Furthermore, after IP connection processing, service connection processing is performed.

Overview of Embodiments

Processing of discriminating between a plurality of types of print services which share a communication protocol in the application layer of the communication layers of the OSI reference model between a portable communication terminal apparatus and a printing apparatus using Wi-Fi Direct will be described according to each embodiment. Examples of such communication protocol include the WSD (Web Services for Devices) protocol, IPP (Internet Print protocol), and UPnP (Universal Plug and Play) protocol. Such communication protocol may be commonly used by a plurality of print services. A plurality of embodiments will be explained below.

In the first embodiment, a server has a leading role in assigning a different destination port number to each type of print service, and notifies a client of it, thereby performing processing corresponding to each service.

In the second embodiment, respective services are discriminated by using the fact that a wireless LAN connection phase (connection procedure) used is different depending on the type of print service. This enables the server side to discriminate between the services with respect to a request or data transmitted from the client to the server even if the client uses the same port (for example, a default destination port) for each service.

In the third embodiment, respective services are discriminated by assigning a different URL as destination information to each type of print service. This allows discrimination between services even if the same port is used for each service.

FIG. 10 is a sequence chart showing a wireless connection phase in Wi-Fi Direct according to each embodiment.

In Wi-Fi Direct, among devices which communicate with each other, one becomes a P2P client 700 and the other becomes a group owner 750 serving as an access point. These roles are decided between the devices which communicate with each other. A case in which a portable communication terminal apparatus 200 serves as the P2P client 700 and an MFP 300 serves as the group owner 750 will be described here. Note that even if the portable communication terminal apparatus 200 serves as a P2P group owner and the MFP 300 serves as a P2P client, it is not necessary to consider it in the application layer in which the service is used.

The basic sequence of the wireless connection phase (the WFD mode of FIG. 8 or the WFD extend mode of FIG. 9) in Wi-Fi Direct will be explained below with reference to FIG. 10.

Note that a device having a communication function complying with Wi-Fi Direct calls an application dedicated for implementing the communication function through an operation unit. Then, the device having the communication function complying with Wi-Fi Direct can instruct execution of negotiation for performing Wi-Fi Direct communication based on an operation of a UI (User Interface) provided by the application.

Phase P701: To perform communication by Wi-Fi Direct, the portable communication terminal apparatus 200 transmits a device discovery command to discover a device which can perform communication by Wi-Fi Direct. Upon receiving the device discovery command, the MFP 300 responds to the command to start a procedure for performing communication by Wi-Fi Direct.

Phase P702: The portable communication terminal apparatus 200 and the MFP 300 confirm information about services and functions which can be provided to each other (device provision information confirmation). This information can include a destination port number to be used in each of various services and destination information indicating the destination of the information. This processing is optional, and can be basically omitted in a mode except for the WFD extend mode.

Phase P703: It is decided which of the devices serves as a P2P client or a group owner. In this example, the portable communication terminal apparatus 200 which requests a print service serves as the P2P client 700 and the MFP 300 which provides the print service serves as the group owner 750.

Phase P704: When the P2P client 700 and the group owner 750 are decided, they exchange parameters for performing communication by Wi-Fi Direct.

Phase P705: Based on the exchanged parameters, the remaining wireless connection processing is performed between the P2P client 700 and the group owner 750.

Phase P706: Based on the exchanged parameters, IP connection processing is performed between the P2P client 700 and the group owner 750. In this example, IPv4 and IPv6 are simultaneously used. Note that only one of IPv4 and IPv6 may be used.

Phase P707: Based on the exchanged parameters, communication is performed between the P2P client 700 and the group owner 750 using a predetermined network protocol, thereby exchanging print data according to the print service.

In at least one of the phases P701, P702, and P707 of this basic sequence, a destination port number to be used in a service to be provided is sent as destination information in the first embodiment, and a URL to be used in a service to be provided is sent as destination information in the third embodiment. With this notification processing, if destination information for using respective services overlap each other, the destination information to be used between the P2P client 700 and the group owner 750 are set to be different from each other. This allows the use of individual destination information for each service used, thereby normally executing the behavior of the service.

On the other hand, in the second embodiment, a specific service is discriminated from other services using the fact that a specific connection phase (for example, the phase P702 of FIG. 10) is always performed for the specific service, thereby normally executing the processing of each service.

Each embodiment will be described in detail below.

First Embodiment

In the first embodiment, processing will be described, in which even if a common communication protocol is used in the application layer, a server for providing a service assigns a different destination port number to each type of print service, and notifies a client of the contents, thereby explicitly discriminating a plurality of services.

Especially, in the first embodiment, a case in which a print service is used as a service used between the client and the service will be exemplified. The present invention, however, is not limited to this. This embodiment is applicable to various services provided by the server. The various services include, for example, a service of saving image data obtained by reading a document by a scanner in a predetermined storage device, a service of saving a desired file in a predetermined storage device, and a service of providing a file saved in a predetermined storage device. Destination information such as a destination port number or destination URL used in communication at this time is discriminated for each service, and a service is specified based on the presence/absence of a communication procedure specific to the service.

Figure 11:
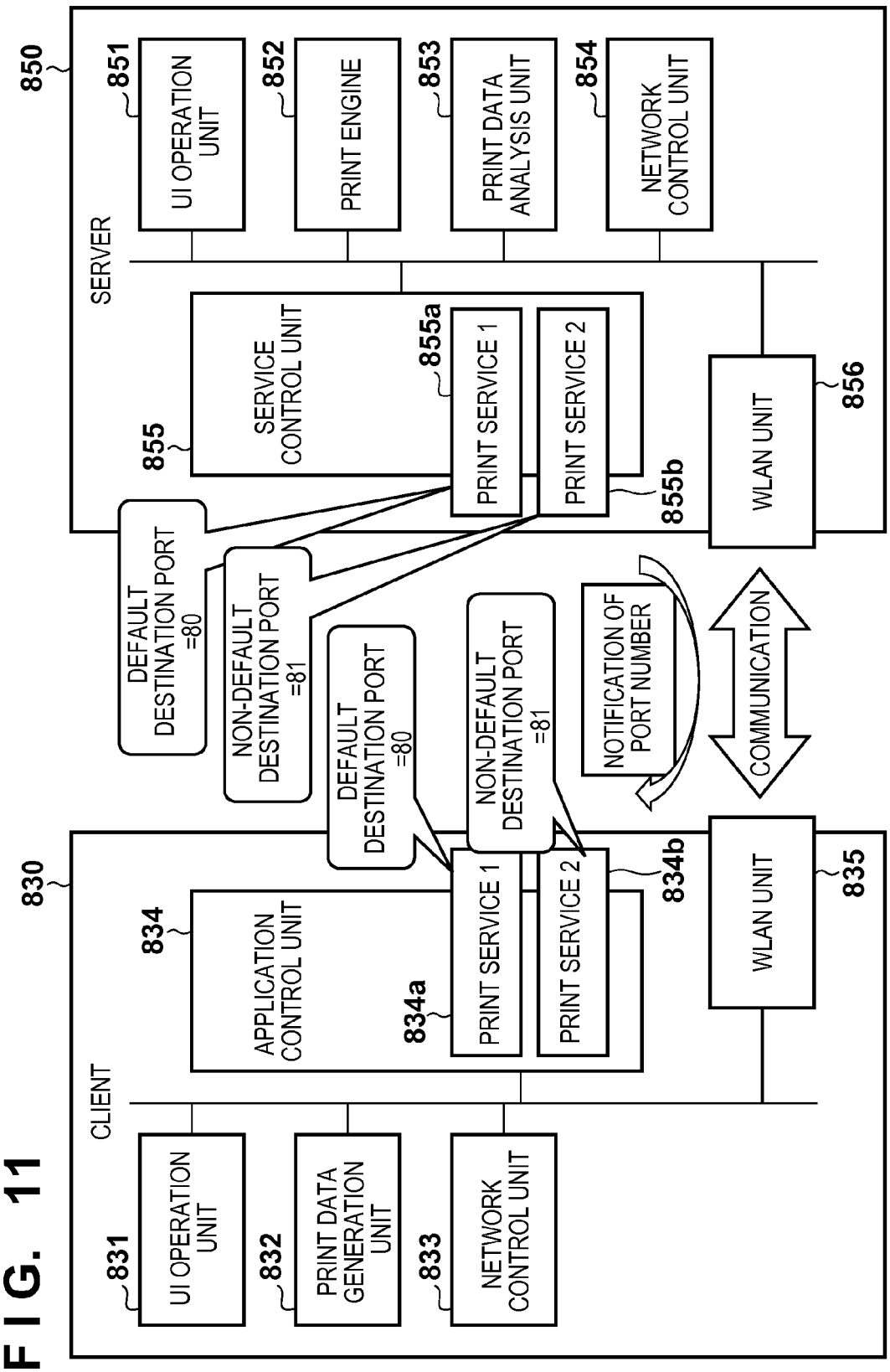
FIG. 11 is a block diagram showing functional components in a system according to the first embodiment.

FIG. 11 is a block diagram showing functional components in a system according to the first embodiment.

Referring to FIG. 11, reference numeral 830 denotes a client which uses a service such as a print service. In this example, assume that the client 830 is a portable communication terminal apparatus 200 (a device decided to serve as a P2P client 700 in P703 of FIG. 10). Reference numeral 850 denotes a server which provides a service such as a print service. In this example, assume that the server 850 is an MFP 300 (a device decided to serve as a group owner 750 in P703 of FIG. 10). Note that whether the device serves as a P2P client or a group owner does not limit the relationship between the client and server of a service.

The client 830 includes a UI operation unit 831, a print data generation unit 832, a network control unit 833, an application control unit 834, and a WLAN unit 835 as main functional components used to implement the following processing in the embodiment.

The UI operation unit 831 is implemented by a CPU 702 and operation unit 708 of FIG. 5. The UI operation unit 831 displays a UI for various operations performed by the portable communication terminal apparatus 200 including a UI for performing communication by Wi-Fi Direct, accepts an input from the user via the UI, and executes processing corresponding to the input.

The print data generation unit 832 is implemented by the CPU 702 and a data conversion unit 706 of FIG. 5. The print data generation unit 832 generates print data to be output to the server 850.

The network control unit 833 is implemented by the CPU 702 of FIG. 5. The network control unit 833 controls the operation of a WLAN unit 717 shown in FIG. 5.

The application control unit 834 is implemented by the CPU 702 of FIG. 5. The application control unit 834 controls the operation of processing corresponding to each of various services requested to the server 850. In this example, assume that the application control unit 834 can execute, for example, a print service (print service 1) 834a and a print service (print service 2) 834b. When the user instructs printing from an application corresponding to each print service, the application control unit 834 executes processing according to any one of the print services. The print service is used to transmit the print data generated by the print data generation unit 832 to the server 850 according to a predetermined communication protocol, thereby executing print processing.

Note that in the first embodiment, print service 1 provided by the server 850 is used to execute printing according to standard 1, and print service 2 is used to execute printing according to standard 2. Assume that standards 1 and 2 use the same communication protocol as a communication protocol in the application layer, and the same port number (for example, 80) is used as a default destination port number used in the communication protocol. Note that standards 1 and 2 set different rules for various settings such as a print data format for printing and printing paper designation method.

The WLAN unit 835 is implemented by the WLAN unit 717 of FIG. 5. The WLAN unit 835 performs WLAN communication including communication by Wi-Fi Direct.

The server 850 includes a UI operation unit 851, a print engine 852, a print data analysis unit 853, a network control unit 854, a service control unit 855, and a WLAN unit 856 as main functional components used to implement the following processing in the embodiment.

The UI operation unit 851 is implemented by a CPU 802 and operation unit 809 of FIG. 6. The UI operation unit 851 displays a UI for various operations performed by the MFP 300 including a UI for performing communication by Wi-Fi Direct, accepts an input from the user via the UI, and executes processing corresponding to the input.

The print engine 852 is implemented by a printing unit 815 of FIG. 6. The print engine 852 executes printing based on print data analyzed by the print data analysis unit 853.

The print data analysis unit 853 is implemented by a data conversion unit 807, encoding/decoding processing unit 812, and printing control unit 816 of FIG. 6. The print data analysis unit 853 analyzes, through a print service provided by the service control unit 855, print data received from the client 830.

The network control unit 854 is implemented by the CPU 802 of FIG. 6. The network control unit 854 controls the operation of a WLAN unit 817 shown in FIG. 6.

The service control unit 855 is implemented by the CPU 802 of FIG. 6. The service control unit 855 provides various services implemented by the server to the client 830, and controls the operations of the services. In this example, the service control unit 855 executes, for example, a print service (print service 1) 855a and a print service (print service 2) 855b. In general, it is possible to obtain a correct printing result by setting rules by a standard or the like for control of a print service performed between the client and the server. The service control unit 855, therefore, executes processing according to data of a format and a printing paper designation method, which comply with each print service (standard).

The WLAN unit 856 is implemented by the WLAN unit 817 of FIG. 6. The WLAN unit 856 performs WLAN communication including communication by Wi-Fi Direct.

In the first embodiment, the server 850 determines whether there are a plurality of services which use the same communication protocol (application layer) among services provided by itself. If there are a plurality of such services, the server 850 determines the number of services. If it is determined that there are two or more such services, the MFP 300 assigns different destination port numbers to the respective services so as to provide the services using different destination information (port numbers) for the respective services. The server 850 notifies the client 830 of the assigned destination port numbers. This notification is sent as a response to a device discovery request in P701 of FIG. 10, sent in a device provision information confirmation phase P702, or sent in P707.

Note that a destination port number to be assigned is a free port number except for existing port numbers.

In the example shown in FIG. 11, as print services, there exist print services of types including the print service (print service 1) 855a and the print service (print service 2) 855b. For example, the server 850 assigns a destination port number of 80 (default destination port) to the print service (print service 1) 855a, and assigns a destination port number of 81 (non-default destination port) to the print service (print service 2) 855b. The server 850 notifies the client 830 of each print service and its corresponding destination port number. At this time, if the port number of the transmission source port of a print service is permitted, the client 830 need not change the port number to match that on the server side. The client 830 assigns the sent destination port numbers to the destination port of the print service 1 834a and that of the print service 2 834b.

By receiving the notification, the client 830 can specify and assign a port number to be used as a destination for the print service to be used by itself.

Processing executed by the server 850 according to the first embodiment in the arrangement shown in FIG. 11 will be described with reference to FIG. 12.

Figure 12:
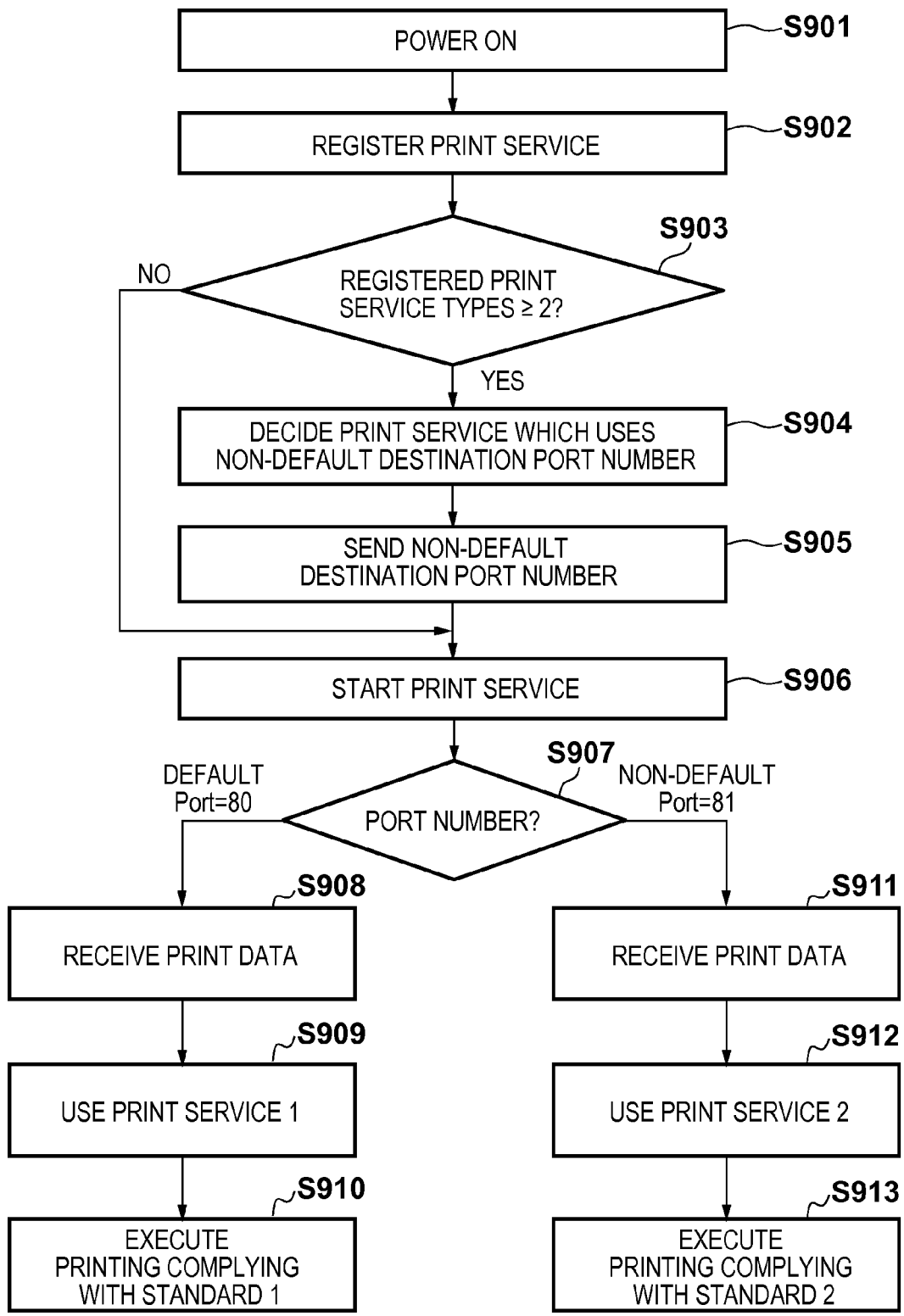
FIG. 12 is a flowchart illustrating processing executed by a server 850 according to the first embodiment.

FIG. 12 is a flowchart illustrating the processing executed by the server 850 according to the first embodiment.

In step S901, upon power-on based on an operation through the UI operation unit 851, the server 850 (MFP 300) starts the process.

In step s902, the service control unit 855 registers, in a nonvolatile memory 805, a service which can be provided to a device serving as the client 830. In this case, the print service (print service 1) 855a and the print service (print service 2) 855b are registered.

In step S903, the service control unit 855 determines whether the number of registered print service types is equal to or larger than two. If the number of types is smaller than two (NO in step S901), the process advances to step S906; otherwise (YES in step S901), the process advances to step S904.

In step S904, the service control unit 855 specifies the default destination port number of the two or more registered print services, and assigns destination port numbers unique to the respective print services so that the respective print services use different port numbers. More specifically, the service control unit 855 decides, among the two or more print services, a print service which uses a non-default destination port number different from the default destination port number. According to the number of such print services, the service control unit 855 assigns a different non-default destination port number to each print service except for the print service which uses the default destination port number. As described above, in the example of FIG. 11, the default destination port number (80) is assigned to the print service (print service 1) 855*a* and a non-default destination port number (81) is assigned to the print service (print service 2) 855*b*.

In step S905, the service control unit 855 notifies the client 830 of information for specifying the print service assigned with the non-default destination port number and the corresponding non-default destination port number as assignment information. If a device discovery command is received from the client 830, the notification in step S905 is sent as a response to the received command, sent in the device provision information confirmation phase after the reception of the device discovery command, or exchanged after IP connection. That is, after the processing in step S904, the server 850 stands by for access from another device. When another device accesses the server 850, processing in step S905 and subsequent steps is performed.

In step S906, to accept a print service requested by the client 830, the service control unit 855 starts a print service corresponding to the port number designated by the client 830.

In step S907, the service control unit 855 determines the reception port number designated by the client 830.

If it is determined in step S907 that the port number is 80 (the default destination port number), in step S908 the service control unit 855 receives print data via the port. In step S909, the service control unit 855 and the print data analysis unit 853 make various print settings for the received print data in accordance with the print service (print service 1) 855*a*. In step S910, the print engine 852 executes printing complying with standard 1 in accordance with the various print settings.

On the other hand, if it is determined in step S907 that the port number is 81 (the non-default destination port number), in step S911 the service control unit 855 receives print data via the port. In step S912, the service control unit 855 and the print data analysis unit 853 make various print settings for the received print data in accordance with the print service (print service 2) 855*b*. In step S913, the print engine 852 executes printing complying with standard 2 in accordance with the various print settings.

Note that in the above description, in step S905, only the non-default destination port is sent. However, the default destination port and the non-default destination port may be sent together with information for specifying print services respectively corresponding to the ports. Furthermore, in the above description, one service uses the default destination port. However, non-default destination ports may be used for all services and, in this case, different port numbers may be used.

As described above, according to the first embodiment, even if the same communication protocol is used in the application layer, a different port number is assigned to each service, and a client is notified of it, thereby explicitly using the different services.

Second Embodiment

In the second embodiment, processing will be described, in which if standards define different wireless LAN connection phases to be used in accordance with print service types, a plurality of services are discriminated based on the difference.

Note that functional components in a system according to the second embodiment comply with those shown in FIG. 11 of the first embodiment and a description thereof will be omitted.

In the second embodiment, assume that print service 1 provided by a server 850 is used to execute printing according to standard 1, and print service 2 is used to execute printing according to standard 2. Assume also that standards 1 and 2 use communication protocols whose wireless connection phases (for example, the WFD mode of FIG. 8 and the WFD extend mode of FIG. 9) are different, and the print services use the same port number (for example, 80). Note that different port numbers may be used.

Processing executed by the server 850 according to the second embodiment will be described with reference to FIG. 13.

Figure 13:
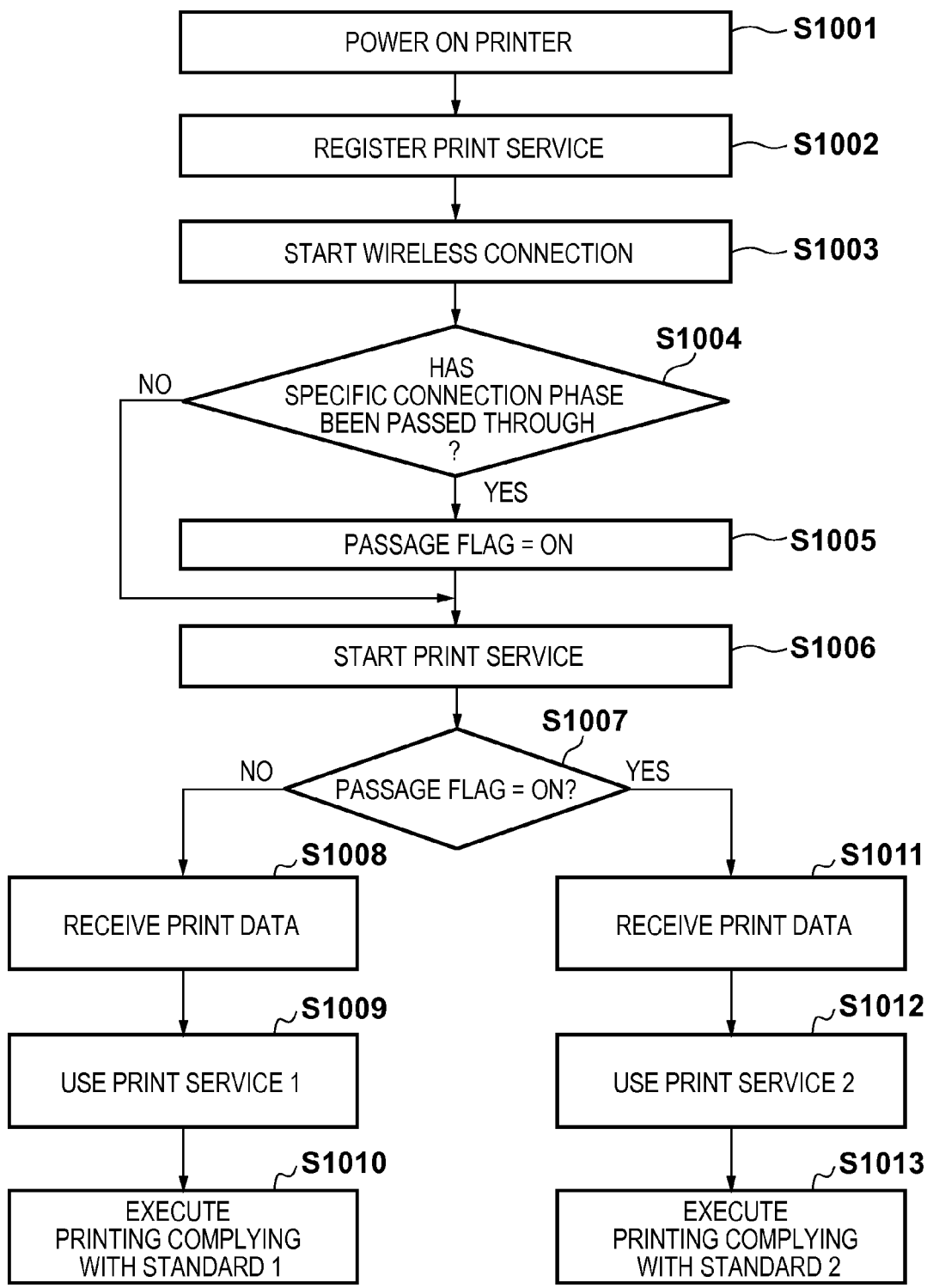
FIG. 13 is a flowchart illustrating processing executed by a server 850 according to the second embodiment.
Figure 15:
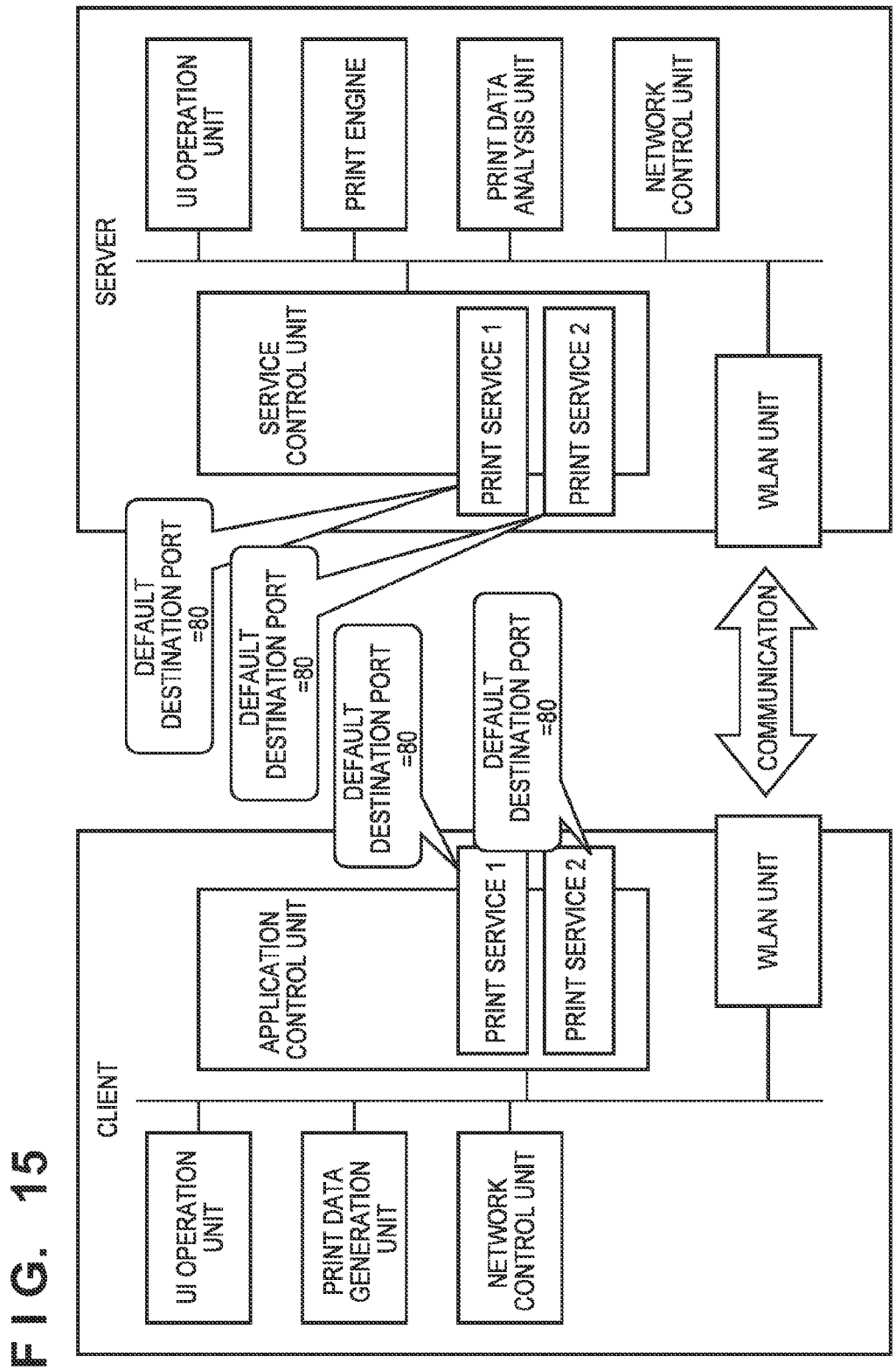
FIG. 15 is a block diagram for explaining the problem in the conventional technique.

FIG. 13 is a flowchart illustrating the processing executed by the server 850 according to the second embodiment.

In step S1001, upon power-on based on an operation through a UI operation unit 851, the server 850 (an MFP 300) starts the process.

In step S1002, a service control unit 855 registers, in a nonvolatile memory 805, a service which can be provided to a device serving as a client 830. In this case, a print service (print service 1) 855*a* and a print service (print service 2) 855*b* are registered. After this processing, the server 850 stands by for access from another device.

Upon wirelessly receiving an access request from the client 830, in step S1003 a network control unit 854 starts wireless connection according to a requested connected procedure. In step S1004, the network control unit 854 determines whether a specific connection phase of a series of connection phases executed according to the connection procedure in the started wireless connection processing has been passed through.

For example, the difference between the WFD mode and the WFD extend mode is the presence/absence of a device provision information confirmation phase. It is, therefore, determined whether the device provision information confirmation phase has been performed. Note that the device provision information confirmation phase is optional in the WFD mode, and thus this connection phase may be performed even if the client is in the WFD mode. In this case, by referring to the contents of a device provision information confirmation command transmitted by the client, it is determined whether WFD extend attributes are contained. If no WFD extend attributes are contained, it is considered to be equivalent to the WFD mode, and a passage flag is turned off in step S1005. If WFD extend attributes are contained, the passage flag is turned on in step S1005.

In this example, assume that the print service (print service 1) 855*a* operates in the WFD mode and complies with standard 1, and the print service (print service 2) 855*b* operates in the WFD extend mode and complies with standard 2. That is, if the specific phase has been passed through, it can be determined that print service 2 should be executed; otherwise, it can be determined that print service 1 should be executed.

Note that determination of whether to turn on or off the passage flag of the specific connection phase is not limited to the device provision information confirmation phase P702 of FIG. 10. It is also possible to use one of a role decision phase P703, a parameter exchange phase P704, an IP connection phase P706, and a network protocol phase P707.

For example, when only a specific service defines only IPv6 and other services define only IPv4, in the IP connection phase P706, it is possible to turn on the passage flag in step S1005 only if the client transmits a request using IPv6. Conversely, if the client transmits a request using IPv4, it is possible to turn off the passage flag in step S1005. That is, if a plurality of standards set different rules with respect to IP connection, it is possible to discriminate a service being used by only determining the IP connection phase, immediately before the server side starts printing. Similarly, even for other connection phases, if a plurality of standards set different rules, it is possible to control to turn on/off the passage flag in step S1005.

If the specific connection phase has not been passed through (NO in step S1004), the process advances to step S1006; otherwise (YES in step S1004), the process advances to step S1005.

In step S1005, the network control unit 854 turns on the passage flag, indicating that the specific connection phase has been passed through. The status (ON/OFF) of the passage flag is stored in, for example, a RAM 804 of the MFP 300.

In step S1006, to accept a print service requested by the client 830, the service control unit 855 starts a print service corresponding to the wireless connection mode.

In step S1007, the service control unit 855 determines whether the passage flag is ON. If the passage flag is not ON (NO in step S1007), that is, if the passage flag is OFF, in step S1008 the service control unit 855 starts to receive print data. In step S1009, the service control unit 855 and the print data analysis unit 853 make various print settings for the received print data in accordance with the print service (print service 1) 855a. In step S1010, the print engine 852 executes printing complying with standard 1 in accordance with the various print settings.

On the other hand, if it is determined in step S1007 that the passage flag is ON (YES in step S1007), in step S1011 the service control unit 855 starts to receive print data. In step S1012, the service control unit 855 and the print data analysis unit 853 make various print settings for the received print data in accordance with the print service (print service 2) 855b. In step S1013, the print engine 852 executes printing complying with standard 2 in accordance with the various print settings. In other words, standard 2 is associated with the specific connection phase. Furthermore, if standards 1 and 2 set different rules for an error, the behavior is switched according to the print service. Assume, for example, that a reception time-out time is set to 60 sec in standard 1 and set to 120 sec in standard 2. In this case, the reception time-out time is switched by associating a print service type with a specific connection phase.

As described above, according to the second embodiment, it is possible to discriminate between a plurality of services by using the fact that a wireless LAN connection phase to be used is different depending on a print service type. This makes it possible to discriminate between a plurality of services even if the respective services use the same port.

Third Embodiment

In the third embodiment, processing will be described, in which even if a common communication protocol is used in the application layer, services are discriminated by switching an URL as a printing request reception destination depending on a print service type.

Note that functional components in a system according to the third embodiment comply with those shown in FIG. 11 of the first embodiment and a description thereof will be omitted.

In the third embodiment, a server 850 determines whether there are a plurality of services which use the same communication protocol (application layer) among services provided by itself. If there are a plurality of such services, the server 850 determines the number of services. If it is determined that there are two or more such services, the server 850 assigns different URLs to the respective services so as to provide the services using different destination information (URLs) for the respective services. The server 850 notifies a client 830 of the assigned URLs. This notification is sent as a response to a device discovery request in P701 of FIG. 10, sent in a device provision information confirmation phase P702, or sent in P707.

In the example of FIG. 11, as print services, there exist print services of types including a print service (print service 1) 855a and a print service (print service 2) 855b. For example, the server 850 assigns a default destination URL (for example, http://printer/service1) to the print service (print service 1) 855a. The server 850 also assigns a non-default destination URL (for example, http://printer/service2) to the print service (print service 2) 855b. The server 850 notifies the client 830 of each print service and its corresponding URL. By receiving the notification, the client 830 can specify and assign a URL to be used as a destination for the print service to be used by itself.

Processing executed by the server 850 according to the third embodiment in the arrangement shown in FIG. 11 will be described with reference to FIG. 14.

FIG. 14 is a flowchart illustrating processing executed by the server 850 according to the third embodiment.

In step S1101, upon power-on based on an operation through a UI operation unit 851, the server 850 (an MFP 300) starts the process.

In step S1102, a service control unit 855 registers, in a nonvolatile memory 805, a service which can be provided to a device serving as the client 830. In this case, the print service (print service 1) 855a and the print service (print service 2) 855b are registered.

In step S1103, the service control unit 855 determines whether the number of registered print service types is equal to or larger than two. If the number of types are smaller than two (NO in step S1101), the process advances to step S1106; otherwise (YES in step S1101), the process advances to step S1104.

In step S1104, the service control unit 855 specifies the default destination URL of the two or more registered print services, and assigns destination URLs unique to the respective print services so that the respective print services use different URLs. More specifically, the service control unit 855 decides, among the two or more print services, a print service which uses a non-default destination URL different from the default destination URL. According to the number of such print services, the service control unit 855 assigns a different non-default destination URL to each print service except for the print service which uses the default destination URL. As described above, by replacing the arrangement in the example of FIG. 11 by the arrangement of the third embodiment, the default destination URL is assigned to the print service (print service 1) 855a and a non-default destination URL is assigned to the print service (print service 2) 855b.

In step S1105, the service control unit 855 notifies the client 830 of information for specifying the print service assigned with the non-default destination URL and the corresponding non-default destination URL as assignment information. If a device discovery command is received from the client 830, the notification in step S1105 is sent as a response to the received command, sent in a device provision information confirmation phase after the reception of the device discovery command, or exchanged after IP connection. That is, after the processing in step S1104, the server 850 stands by for access from another device. When another device accesses the server 850, processing in step S1105 and subsequent steps is performed.

In step S1106, to accept a print service requested by the client 830, the service control unit 855 starts a print service corresponding to the URL designated by the client 830.

In step S1107, the service control unit 855 determines the URL designated by the client 830.

If it is determined in step S1107 that the URL is the default destination URL, in step S1108 the service control unit 855 receives print data via the default destination URL. In step S1109, the service control unit 855 and a print data analysis unit 853 make various print settings for the received print data in accordance with the print service (print service 1) 855a. In step S1110, a print engine 852 executes printing complying with standard 1 in accordance with the various print settings.

On the other hand, if it is determined in step S1107 that the URL is a non-default destination URL, in step S1111 the service control unit 855 receives print data via the non-default destination URL. In step S1112, the service control unit 855 and the print data analysis unit 853 make various print settings for the received print data in accordance with the print service (print service 2) 855b. In step S1113, the print engine 852 executes printing complying with standard 2 in accordance with the various print settings.

Note that in the above description, in step S1105, only the non-default destination URL is sent. However, the default destination URL and the non-default destination URL may be sent together with information for specifying print services respectively corresponding to the URLs. Furthermore, in the above description, one service uses the default destination URL. However, non-default destination URLs may be used for all services and, in this case, different URLs may be used.

As described above, according to the third embodiment, even if the same communication protocol is used in the application layer, a different URL is assigned to each service, and a client is notified of it, thereby explicitly using the different services.

Fourth Embodiment

Although the portable communication terminal apparatus 200 and MFP 300 have been exemplified as devices which communicate with each other in the first to third embodiments, such devices are not limited to them as long as they communicate with each other using the P2P method. For example, the present invention may be applied to a case in which a predetermined service is executed between an information processing apparatus such as a personal computer and a peripheral device such as a scanner, facsimile, and display device.

Furthermore, in the first to third embodiments, a case in which processing is performed in wireless communication (wireless network) using Wi-Fi Direct has been exemplified. However, the present invention may be applied to an arrangement in which processing is performed in wired communication (wired network) such as Ethernet® instead of wireless communication.

In addition, in the first to third embodiments, a port number and URL have been exemplified as destination information (default destination information and non-default destination information). However, for example, a plurality of WLAN units may be provided and different IP addresses may be assigned to them.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2013-094639, filed Apr. 26, 2013 and 2014-037322, filed Feb. 27, 2014, which are hereby incorporated by reference herein in their entirety.

What is claimed is:

1. A communication apparatus comprising:
an execution unit configured to be able to execute, as services provided to a single communication partner apparatus with which the communication apparatus communicates via a wireless communication, first and second services, wherein default destination information of the first and second services is first destination information;
a changing unit configured to change the first destination information which is assigned for the second service into second destination information different from the first destination information;
a notification unit configured to notify the single communication partner apparatus of the second destination information that is changed from the first destination information by the changing unit, wherein the first destination information which is assigned for the first service is not notified to the single communication partner apparatus; and
a specifying unit configured to specify the first service if the first destination information is designated by the single communication partner apparatus, and to specify the second service if the second destination information is designated by the single communication partner apparatus, as a service to be executed by the execution unit, wherein the notification unit transmits, in a case where a device search command is received from the single communication partner apparatus, the second destination information as a response to the device search command, wherein the execution unit, the changing unit, the notification unit and the specifying unit are implemented by a processor.

2. The apparatus according to claim 1, wherein
at least one of the first and second services executable by the execution unit is a service which uses Wi-Fi Direct, and one of a rule for control of a service which has been determined between a client and a server and a rule for a data format is different for each service.

3. The apparatus according to claim 1, wherein
the destination information includes at least one of a port number, a URL, and an IP address.

4. The apparatus according to claim 1, further comprising
a printing unit configured to execute printing based on print data received from the single communication partner apparatus,
wherein the first and second services executable by the execution unit are services of performing printing using the printing unit.

5. The apparatus according to claim 4, wherein
the execution unit causes the printing unit to execute printing according to print settings different for each service.

6. The apparatus according to claim 1, wherein
the first and second services use a common communication protocol, and the communication protocol includes at least one of a WSD (Web Services for Devices) protocol, IPP (Internet Printing Protocol), and UPnP (Universal Plug and Play) protocol.

7. The apparatus according to claim 1, wherein
the communication apparatus is further capable of communication with the single communication partner apparatus via the network using wired communication.

8. The apparatus according to claim 1, further comprising:
a determination unit configured to determine whether or not a plurality of services executable by the execution unit are registered;
wherein the changing unit changes, in a case where the determination unit determines that a plurality of services executable by the execution unit are registered, default destination information of at least one of the plurality of services executable by the execution unit into other destination information.

9. The apparatus according to claim 1, wherein the notification unit transmits the second destination information to the single communication partner apparatus after IP connection.

10. A control method for a communication apparatus, which comprises an execution unit capable of executing, as services provided to a single communication partner apparatus with which the communication apparatus communicates via a wireless communication, first and second services, wherein default destination information of the first and second services is first destination information, the method comprising:
changing the first destination information which is assigned for the second service into second destination information different from the first destination information;
notifying the single communication partner apparatus of the second destination information, wherein the first destination information which is assigned for the first service is not notified to the single communication partner apparatus; and
specifying the first service if the first destination information is designated by the single communication partner apparatus, and to specify the second service if the second destination information is designated by the single communication partner apparatus, as a service to be executed by the execution unit,
wherein the second destination information is transmitted as a response to a device search command in a case where the device search command is received from the single communication partner apparatus.

11. The method according to claim 10, wherein
at least one of the first and second services executable by the execution unit is a service which uses Wi-Fi Direct, and one of a rule for control of a service which has been determined between a client and a server and a rule for a data format is different for each service.

12. The method according to claim 10, wherein
the destination information includes at least one of a port number, a URL, and an IP address.

13. The method according to claim 10, wherein the communication apparatus further comprises a printing unit configured to execute printing based on print data received from the single communication partner apparatus,
wherein the first and second services executable by the execution unit are services of performing printing using the printing unit.

14. The method according to claim 13, wherein
the execution unit causes the printing unit to execute printing according to print settings different for each service.

15. The method according to claim 10, wherein
the first and second services use a common communication protocol, and the communication protocol includes at least one of a WSD (Web Services for Devices) protocol, IPP (Internet Printing Protocol), and UPnP (Universal Plug and Play) protocol.

16. The method according to claim 10, wherein
the communication apparatus is further capable of communicating with the single communication partner apparatus via the network using wired communication.

17. A non-transitory computer-readable storage medium storing a program for causing a computer in a communication apparatus to execute a control method for the communication apparatus, wherein the communication apparatus comprises an execution unit capable of executing, as services provided to a single communication partner apparatus with which the communication apparatus communicates via a wireless communication, first and second services, wherein default destination information of the first and second services is first destination information, the control method comprising:
changing the first destination information which is assigned for the second service into second destination information different from the first destination information;
notifying the single communication partner apparatus of the second destination information, wherein the first destination information which is assigned for the first service is not notified to the single communication partner apparatus; and
specifying the first service if the first destination information is designated by the single communication partner apparatus, and to specify the second service if the second destination information is designated by the single communication partner apparatus, as a service to be executed by the execution unit,
wherein the second destination information is transmitted as a response to a device search command in a case where the device search command is received from the single communication partner apparatus.

* * * * *